United States Patent [19]

Kahler et al.

[11] Patent Number: 5,056,364
[45] Date of Patent: Oct. 15, 1991

[54] FUEL GAUGE ASSEMBLY FOR LP GAS TANKS

[75] Inventors: Andrew W. Kahler; Wesley J. Wagner, both of Columbus, Ga.

[73] Assignee: W.C. Bradley Company, Columbus, Ga.

[21] Appl. No.: 565,518

[22] Filed: Aug. 10, 1990

[51] Int. Cl.$^5$ ............................................. G01F 23/20
[52] U.S. Cl. ....................................... 73/296; 177/264
[58] Field of Search .......................................... 73/296

[56] References Cited

U.S. PATENT DOCUMENTS 4,413,515 11/1983 Quinn ................................... 73/296

FOREIGN PATENT DOCUMENTS 1077392 4/1954 France ................................... 73/296

Primary Examiner—Daniel M. Yasich
Attorney, Agent, or Firm—Thomas, Kerr & Kayden

[57] ABSTRACT

A fuel gauge for cart-mounted fuel tanks, particularly LP gas tanks for barbecue grills, is disclosed, the gauge having a bracket secured to the cart and a bracket secured to the tank. The brackets are indirectly coupled through a resilient member and have an indicator rod extending from the cart bracket. The rod is maintained parallel with the tank bracket for indicating the attitude of the tank relative to a fixed reference point, normally an indicator on the control panel of the grill.

18 Claims, 2 Drawing Sheets

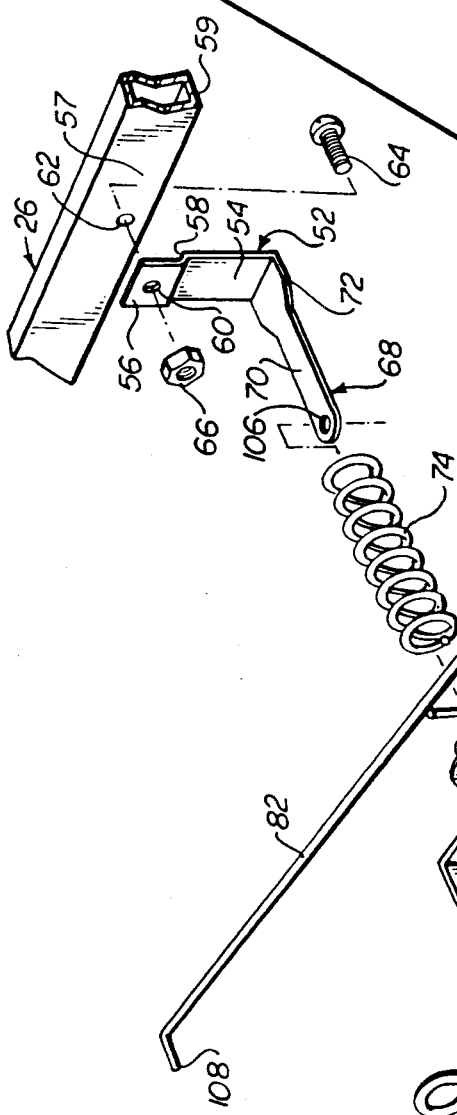
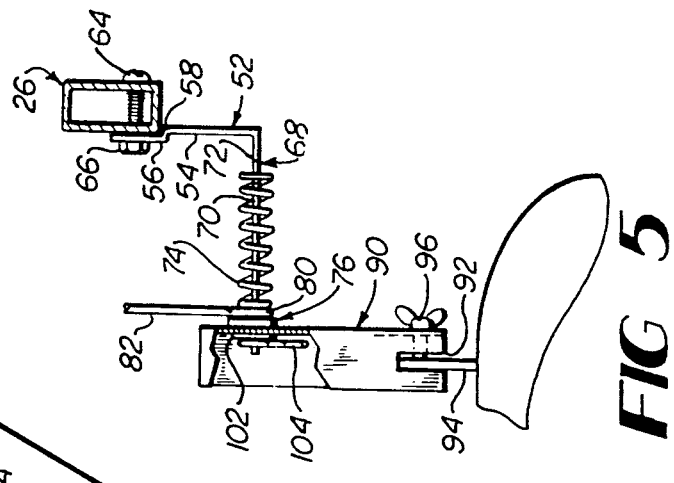
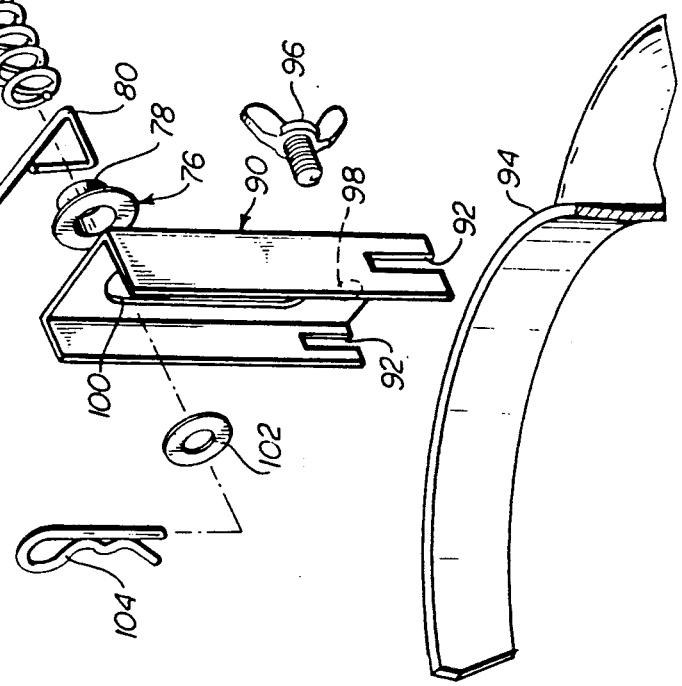

FUEL GAUGE ASSEMBLY FOR LP GAS TANKS

BACKGROUND OF THE INVENTION

Barbecue grills are commonly mounted on wheeled carts and are fueled by LP gas, such as liquid propane, from a tank mounted on the cart. In a typical situation, the LP gas tank is mounted on a lower shelf of the cart, usually on one side or the other. This tends to balance the normally top-heavy cart/grill assembly and, by mounting the tank to the side, provides easy access to the tank and a cooler environment than a central mounting. As noted, the LP gas is used to fuel the barbecue grill and when the tank has been emptied, it is removed from its mounting and transported to a refilling station. After refilling of the tank, it is again mounted beneath the grill, reconnected to the gas regulator hose assembly, and connected to a fuel gauge.

Fuel gauges for such tanks may have various embodiments; however, two common types of gauges are mechanical float gauges and weight/balance type gauges. A mechanical float gauge measures the volume of liquid within the tank via a float and a mechanical linkage contained within the tank. A weight-type gauge is used with the normally round-bottomed LP tank mounted in a slightly off-center position on a relatively thin strut or the like. The strut may include cut-out portions for receiving the bottom rim of the tank, with the weight of the tank serving to keep the rim in the cut-out portions. The tank is mounted off-center so that it will lean to one side or the other depending on the design of the cart and the gauge. Thus, with a particular type the tank will lean to the outside of the grill cart frame. Typically a spring is used in conjunction with a tank holding bracket that will hold a tank in a near balanced position when supporting only the weight of the tank. Under the load of a full tank, the spring compresses, causing the tank to be displaced from the balanced position and thereby moving the fuel gauge.

The typical fuel gauge for an off-center mounted LP gas tank is a rod that extends generally perpendicular from the tank or a bracket mounted on the tank, the rod serving to indicate the degree that the tank leans in one direction or the other, again depending on the particular design. The rod itself may serve as the gauge or the rod may have another indicator means, such as a slidable tab, coupled thereto.

The main problem with such gauges or indicators is that since they are rigidly coupled to the tank they tend to restrict the movement thereof, when the tank is designed to move, i.e. lean to one side or the other. This causes prior art gauges to bind against other parts, for example the control panel, and remain stationary regardless of the amount of fuel in the tank or the degree of lean, or to simply not give an accurate reading. Thus, a need exists in the art for a fuel gauge for cart mounted LP gas tanks that avoids the above-mentioned disadvantages of the prior art.

SUMMARY OF THE INVENTION

It is therefore, one of the principal objects of the present invention to provide a fuel gauge for LP gas tanks, the tanks normally being mounted on a barbecue grill cart, that provides an accurate reading of the amount of fuel in the tank for tanks that are designed to lean slightly to one side or the other depending on the amount of fuel in the tank.

Another object of the present invention is to provide a fuel gauge that is easily installed, disengaged for refilling the tank, and re-installed by the consumer and which is durable to provide a long service life.

A further object of the present invention is to provide a fuel gauge for LP tanks that is inexpensive to manufacture and maintain and which is adaptable for use on LP tanks of grill carts having varied configurations.

These and other objects are attained by the present invention which relates to a fuel gauge for LP gas tanks having a mounting bracket means for attachment to the grill cart and a holding bracket means for attachment to the LP tank. The bracket means have a resilient biasing means disposed therebetween for effecting connection of the two bracket means. A rod means is indirectly mounted around the mounting bracket means, eliminating the fixed construction of prior art fuel gauges. The rod means is also maintained parallel to the holding bracket and is spaced therefrom allowing the rod means to closely track the movement of the holding bracket and consequently the fuel tank.

Various additional objects and advantages of the present fuel gauge for LP gas tanks will become apparent from the following description, with reference to the accompanying drawings.

BRIEF DESCRIPTION OF THE DRAWINGS

FIG. 4 is an exploded, partial, perspective view illustrating in detail the arrangement of the components of the gauge; and FIG. 5 is a partial, side elevational view, shown partially in cross section, illustrating the present fuel gauge in assembled form.

DETAILED DESCRIPTION OF THE PREFERRED EMBODIMENT

Figure 1:
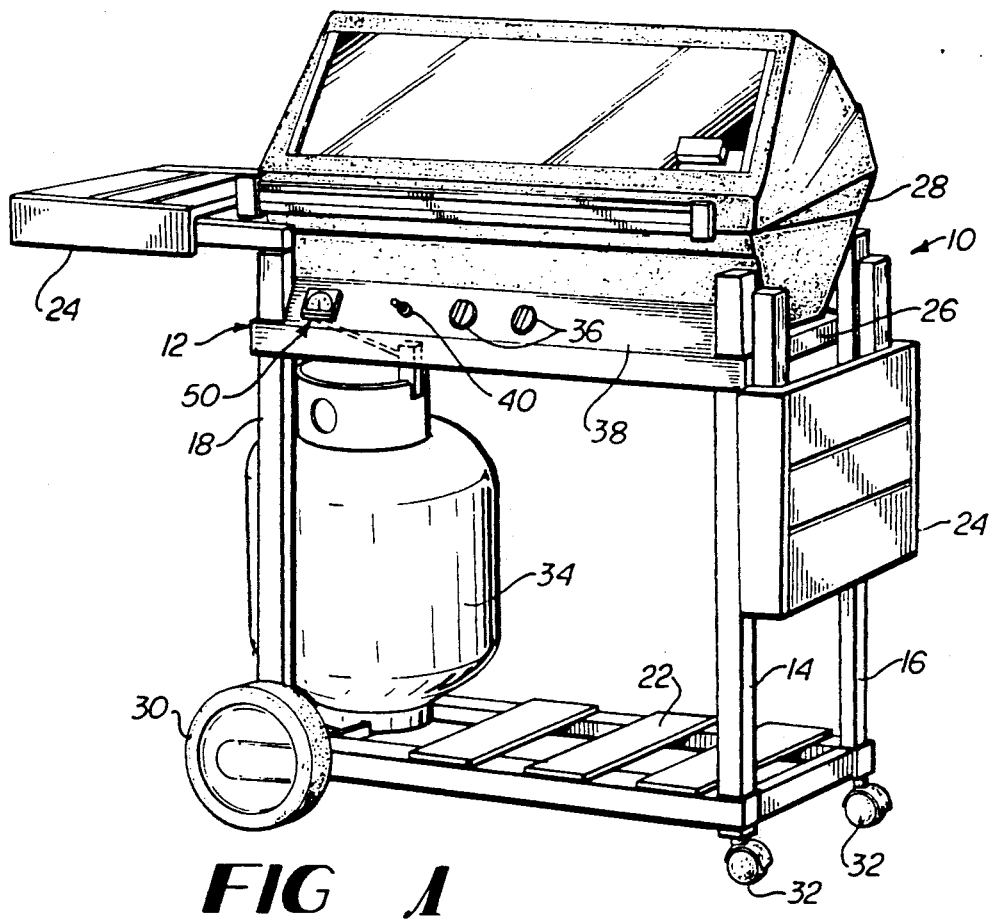
FIG. 1 is a perspective view of a cart-mounted barbecue grill having the present fuel gauge mounted thereon with portions of the gauge shown in broken lines.

Referring now more specifically to the drawings and to FIG. 1 in particular, numeral 10 designates generally a barbecue grill and cart assembly with which the present invention is utilized. In general, the cart assembly 12 includes right and left sets of front and rear legs 14, 16, 18 and 20 (not shown) respectively, a lower bottom shelf 22, and side shelves 24. Struts 26 are provided between the front and rear legs on each side thereof and the barbecue grill 28 is mounted thereon. The cart assembly typically includes wheels 30 and/or casters 32.

A convenient source of fuel for grills of this type is LP gas. The gas is stored in a tank 34 which is mounted on the grill cart 12 below the barbecue grill. A regulator and hose (not shown) are connected to a valve opening at the upper end of the tank 34 and conduct the gas from the tank to the burner assembly in the grill. The gas flow to the burner is turned on or off by control knobs 36 which are mounted on a front control panel 38. The control panel is also normally used for mounting an electronic gas ignitor 40 and a fuel gauge 50.

Referring to FIGS. 2 through 5, and particularly FIGS. 4 and 5, the fuel gauges and the component parts are illustrated in detail. Secured to the strut 26 that connects the front and rear legs on the side of the cart where the tank is mounted is a mounting bracket means 52. This mounting bracket has a generally right angle configuration with a vertically disposed body portion 54. The upper end 56 of body portion 54 is offset slightly from the plane of the body portion so that the plane of the body portion is parallel to the plane of the inner side 57 of the strut 26. The edge 58 of the body portion 54 which is adjacent the upper end 56 and defines the lower boundary thereof engages the bottom edge 59 of strut 26 to lock the mounting bracket against the strut and prevent rotation thereof. This ensures that the mounting bracket is positioned correctly and maintains the horizontal arm 68 of the body portion perpendicular to the strut 26. The mounting bracket includes an aperture 60 in the upper end 56 that corresponds with an aperture 62 in the strut 26. A suitable fastening means such as bolt 64 and nut 66 is used to secure the mounting bracket in place.

The elongated, horizontally disposed arm 68 projects radially from the mounting bracket and includes a relatively narrow end portion 70 and a flared portion 72 that is disposed near the vertical extension 54 thereof. A biasing means such as spring 74 is disposed around leg 68 and is centered therearound by the engagement of the end of the spring with flared portion 72. The opposite end of the spring 74 receives a bushing 76, the flange 78 of which is adapted to receive and seat the triangular end 80 of indicator rod means 82 and also centers the spring against the bushing 76.

A generally U-shaped holding bracket means 90 is secured to the fuel tank 34. The holding bracket has slots 92 in the lower end thereof which engage the upper rim 94 of the tank. With the slots fully engaged on the rim of the tank, a wing nut 96 is disposed through a threaded aperture 98 in the bracket 90 to secure the holding bracket to the tank rim. The holding bracket also includes an elongated slot 100, formed longitudinally in the body thereof. The end portion 70 of arm 68 extends through slot 100 and through a retaining means such as washer 102 and is secured therein by a cotter pin 104 that is inserted through aperture 106 in the end of arm 68.

From the assembled view of the gauge components, as seen in FIG. 5, it will be appreciated that the spring 74 is slightly compressed around the arm 68 with a full load of gas in the tank and is held by the connection of the cotter pin through slot 100. This arrangement biases the tank and the full load of gas toward the exterior of the cart frame despite the spring force. As the gas in the tank is depleted, the spring force against the weight of the tank causes the tank to assume a substantially balanced or vertical position. The rod 82 is maintained parallel to the bracket 90 by virtue of the triangular end 80 thereof being engaged around flange 78 of the bushing 76. This relationship could also easily be reversed by a reversal of the mounting means for the tank and brackets, as will be readily appreciated by those skilled in the art.

Figures 2, 3:
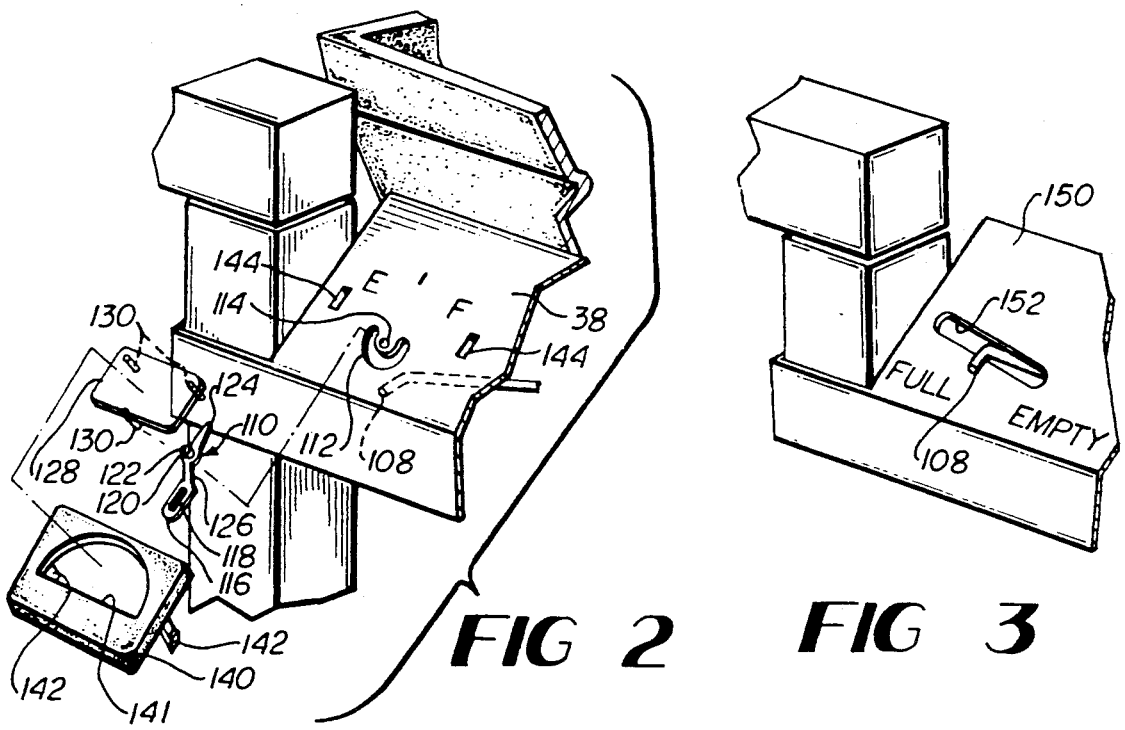
FIG. 2 is an exploded partial perspective view, illustrating an embodiment of the control panel mounted fuel indicator dial.
FIG. 3 is a partial, perspective view illustrating an alternate embodiment of the fuel indicator means.

The direction in which the fuel tank is leaning is manifested through the indicator rod means 82, which extends from its mounting on bushing 76 toward or through the control panel of the grill, the two embodiments shown respectively in FIGS. 2 and 3. In both embodiments, when the tank is full and is leaning outwardly from the cart frame, the tip 108 of the indicator rod 82 is disposed toward the exterior of the cart frame. The tip of the rod is moved toward the interior of the cart frame as the gas in the tank is depleted and the tank assumes a more upright position.

In the embodiment shown in FIG. 2, the action of the indicator rod is translated through a pivoted needle indicator 110. The control panel 38 is provided with a semicircular cutout 112 having an aperture 114 formed above the cutout and centrally located in relation thereto. The needle indicator 110 is Z-shaped and has a lower end 116 with a slot 118 for receiving the tip 108 of the rod 82. The lower end 116 is disposed beneath the surface of the control panel when installed. The needle indicator also includes a pivot pin 120 which is pivotally received in aperture 114 and includes a depression 122 in its upper end. The upper end 124 of the needle indicator is disposed above the outer surface of the control panel while the intermediate portion 126 thereof travels in the cutout 112. Covering the needle indicator is a clear window 128 having three feet 130 arranged in a triangular configuration. The lower foot is received in depression 122 in the upper end of the pivot pin 120 while the upper two feet bear against the control panel. A cover means 140 having a cutout portion 141 then overlies the window, the cover having clips 142 that are received in corresponding slots 144 formed in the control panel 38.

As noted, when the tank is full, it will lean toward the outside of the cart frame and the indicator rod 82 will be disposed toward the exterior of the frame as well. With the tip 108 of the rod engaged in the slot 118, end 116 of the needle indicator will be disposed toward the exterior of the cart frame and the needle tip 124 will point toward the interior of the cart frame. As shown in FIG. 2, the control panel is labeled with a level indicating legend and in the situation just described, the needle will be pointing toward the full or "F" indicator. As the fuel is depleted, the rod moves toward the interior of the cart frame and the needle tip is moved toward the exterior of the cart frame and the empty or "E" indicator.

An alternate embodiment of the fuel indication means is shown in FIG. 3. In this embodiment, a control panel 150 has a slot 152 formed therein through which the tip 108 of the rod 82 projects. This embodiment provides a direct indication from the rod itself as opposed to the indirect indication provided by the embodiment shown in FIG. 2. The action of the rod is the same, the tip 108 being closer to the exterior of the cart frame when the tank is full and moving toward the interior of the cart frame as the fuel is depleted. The difference here lies in the reversal of the "Full" and "Empty" indications on the control panel.

Thus, as noted, gauges of the same general type as the present invention measure the degree which the tank leans to one side or the other, this being a function of the weight of the tank and the slightly off-center mounting of the tank on the cart. Prior art gauges of this type have indicator rods that are rigidly coupled to the tank and thus tend to restrict the movement of the tank. The present invention provides a far more accurate indication of the attitude of the tank due to the indirect coupling of the indicator means between the tank and the cart frame which provides essentially frictionless operation while maintaining the required positive securement of the tank on the cart. The indicator rod means 82 is always maintained in a perfectly centered and easily aligned position around the mounting bracket 52 which obviates the binding problems which affected the performance of prior art gauges. As a result, the user of the grill can easily determine when the tank is becoming empty and can then remove the tank and take it to be refilled.

A further advantage to the present fuel gauge is that by virtue of the indirect coupling of the indicator means 82 to the tank, the tank bracket need only have the slots 92 disengaged from the rim 94 of the tank for removing the tank. This is accomplished by loosening wing nut 96 and lifting the bracket 90 upwardly from the rim of the tank. The indicator rod means remains connected between the tank holding bracket 90 and the cart mounting bracket 52. When the tank has been filled, it is replaced on the cart, the slots of the bracket are slid down over the rim of the tank, and the wing nut 96 is tightened against the tank rim. The indicator rod 82 remains coupled to the needle indicator 110, as shown in FIG. 2, or disposed through the control panel, as shown in FIG. 3.

While an embodiment of a fuel gauge for LP gas tanks and modifications thereof have been shown and described in detail herein, various additional changes and modifications may be made without departing from the scope of the present invention.

We claim:

1. A fuel gauge for measuring an attitude of fuel tanks mounted on a cart in which the cart includes a front control panel and the fuel gauge includes means for indicating the fuel level on said control panel, and in which the tank is mounted on the cart in an off-center position thus causing the tank to lean to one side or the other, said gauge comprising a mounting bracket means secured to the cart and having an arm member projecting generally horizontally therefrom, a tank holding bracket means secured to the LP gas tank and having a slot means formed therein for receiving said arm member, and an indicator rod means having a first end adapted to be disposed around said arm member and a second end extending radially therefrom and adapted to engage said means for indicating the fuel level on said control panel to thereby indicate an attitude of the fuel tank.

2. A fuel gauge as defined in claim 1, in which said gauge includes a resilient means disposed around said arm member and between said indicator rod means and said mounting bracket means for urging said indicator rod means against said tank holding bracket means.

3. A fuel gauge as defined in claim 2 in which said gauge includes a bushing having a flanged side for receiving said first end of said indicator rod means and a flattened side for engaging said holding bracket means.

4. A fuel gauge as defined in claim 2 in which said gauge includes a bushing having a flanged side for receiving and centering said resilient means and a flattened side for engaging said holding bracket means.

5. A fuel gauge as defined in claim 1 and including means for retaining said arm member in said slot means.

6. A fuel gauge as defined in claim 5, in which said gauge includes a resilient means disposed around said arm member and between said indicator rod means and said mounting bracket means for urging said indicator rod means against said tank holding bracket means.

7. A fuel gauge as defined in claim 6 in which said arm member includes a flared portion for centering said resilient means therearound.

8. A fuel gauge as defined in claim 1 in which said means for indicating the fuel level includes a pivotally mounted indicator needle having a slotted end for engaging said indicator rod and a second pointed end for pointing to said indicating means.

9. A fuel gauge for fuel tanks mounted on a cart in which the cart has a fixed fuel indication means associated therewith and in which said tank is mounted on the cart in an off-center position and is designed to lean to one side or to assume a balanced position depending on the amount of fuel in said tank, said gauge comprising a mounting bracket secured to said cart and having an arm member extending radially therefrom, a holding bracket adapted to engage said fuel tank and also adapted to receive and retain said arm member, a indicator rod means adapted to engage said arm member and projecting radially therefrom, and a means for biasing said rod means against said holding bracket for maintaining said rod means parallel to said holding bracket and indicating an attitude of said fuel tank by comparing the position of said radially projecting rod means with said fixed fuel indication means associated with said cart.

10. A fuel gauge as defined in claim 9 in which said means for biasing said rod means includes a spring disposed around said arm member and said arm member includes means for centering and retaining said spring thereon.

11. A fuel gauge as defined in claim 9 in which said holding bracket includes an elongated slot means formed therein for receiving said arm member.

12. A fuel gauge as defined in claim 9 in which said cart includes a control panel with a slot formed therein for receiving said rod means and the fixed fuel indication means is marked on said control panel is corresponding relationship to said slot.

13. A fuel gauge is defined in claim 9 in which said indicator rod means has one end adapted to be disposed around said arm member and said gauge includes a bushing disposed around said arm member with a flanged side for receiving said one end of said indicator rod means and a generally flat side for engaging said holding bracket.

14. A fuel gauge as defined in claim 13 in which said means for biasing said rod means includes a spring disposed around said arm member and said flanged side of said bushing for centering said spring therearound.

15. A fuel gauge for fuel tanks mounted on a cart in which the cart includes a control panel with a fuel level indicator means and the tank is mounted on the cart with an off center mounting and is designed to lean to one side depending on the amount of fuel in the tank, wherein the improvement comprises, a mounting bracket secured to the cart and having a generally horizontal arm member projecting radially therefrom, a holding bracket secured to the tank, disposed parallel thereto and a slot means for receiving and retaining said horizontal arm member therein, an indicator rod member having one end adapted to engage said horizontal arm member and the other end adapted to engage the fuel level indicator means on the control panel, and means of maintaining said indicator rod member in generally parallel relationship with said holding bracket for indicating the degree of lean of the fuel tank relative to the fuel level indicator means on the control panel.

16. A fuel gauge as defined in claim 15, in which said gauge includes a resilient means disposed around said arm member and between said indicator rod means and said mounting bracket means for urging said indicator rod means against said tank holding bracket means.

17. A fuel gauge as defined in claim 16 in which said gauge includes a bushing having a flanged side for receiving said first end of said indicator rod means and a flattened side for engaging said holding bracket means.

18. A fuel gauge as defined in claim 16 in which said arm member includes a flared portion for centering said resilient means therearound.

* * * * *